United States Patent
Ross et al.

(10) Patent No.: US 10,817,066 B2
(45) Date of Patent: Oct. 27, 2020

(54) INFORMATION PRIVACY IN VIRTUAL REALITY

(71) Applicant: GOOGLE INC., Mountain View, CA (US)

(72) Inventors: Christopher Ross, New York, NY (US); Ian MacGillivray, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 184 days.

(21) Appl. No.: 15/718,689

(22) Filed: Sep. 28, 2017

(65) Prior Publication Data
US 2018/0157333 A1    Jun. 7, 2018

Related U.S. Application Data

(60) Provisional application No. 62/430,137, filed on Dec. 5, 2016.

(51) Int. Cl.
*G06F 17/00* (2019.01)
*G06F 3/01* (2006.01)
(Continued)

(52) U.S. Cl.
CPC .............. *G06F 3/017* (2013.01); *G06F 3/011* (2013.01); *G06F 3/013* (2013.01);
(Continued)

(58) Field of Classification Search
CPC .......... G06F 3/017; G06F 3/011; G06F 3/013; G06F 21/6245; G06F 21/84; H04L 67/38; H04L 65/1069; G06N 3/006
(Continued)

(56) References Cited

U.S. PATENT DOCUMENTS

| | | | |
|---|---|---|---|
| 6,772,195 B1 | 8/2004 | Hatlelid et al. | |
| 7,953,983 B2 * | 5/2011 | Holt | G06F 21/36 |
| | | | 713/182 |

(Continued)

OTHER PUBLICATIONS

Heikkinen et al., Expectations for User Experience in Haptic Communication with Mobile Devices, ACM 2009, pp. 1-10. (Year: 2009).*

(Continued)

*Primary Examiner* — Cong-Lac Huynh
(74) *Attorney, Agent, or Firm* — Brake Hughes Bellermann LLP

(57) ABSTRACT

Systems and methods are described that include generating a virtual reality experience in a virtual reality environment, detecting, a first gesture from a first user accessing the virtual reality environment, the first gesture being configured as a command to initiate a privacy mode with a second user accessing the virtual reality environment, and generating a prompt for display to the second user, the prompt corresponding to the command. In response to detecting a second gesture from the second user, the second gesture determined to substantially match the first gesture, initiating the privacy mode between the first user and the second user in the virtual reality environment, and sharing communications occurring in the virtual environment from the first user to the second user and from the second user to the first user while modifying, for users other than the first user and the second user, the communications occurring between the first user and the second user.

19 Claims, 6 Drawing Sheets

(51) Int. Cl.
*H04L 29/06* (2006.01)
*G06F 21/62* (2013.01)
*G06F 21/84* (2013.01)
*G06N 3/00* (2006.01)
*G06N 5/04* (2006.01)

(52) U.S. Cl.
CPC .......... *G06F 21/6245* (2013.01); *G06F 21/84* (2013.01); *G06N 3/006* (2013.01); *H04L 65/1069* (2013.01); *H04L 67/38* (2013.01); *G06N 5/048* (2013.01)

(58) Field of Classification Search
USPC ........................................................ 715/752
See application file for complete search history.

(56) References Cited

U.S. PATENT DOCUMENTS

| | | | | |
|---|---|---|---|---|
| 8,051,462 | B2* | 11/2011 | Hamilton, II | H04L 63/0428 709/225 |
| 9,075,434 | B2* | 7/2015 | Santos | G06F 3/011 |
| 9,680,983 | B1* | 6/2017 | Schuster | H04M 1/72569 |
| 10,356,215 | B1* | 7/2019 | Cronin | H04L 67/38 |
| 10,386,482 | B2* | 8/2019 | Qiu | G01S 15/46 |
| 2004/0148347 | A1* | 7/2004 | Appelman | H04L 67/22 709/204 |
| 2007/0024527 | A1* | 2/2007 | Heikkinen | A63F 13/52 345/9 |
| 2009/0177977 | A1 | 7/2009 | Jones et al. | |
| 2009/0239587 | A1* | 9/2009 | Negron | G06F 3/04883 455/566 |
| 2009/0303984 | A1 | 12/2009 | Clark et al. | |
| 2010/0153859 | A1 | 6/2010 | Dawson et al. | |
| 2010/0295785 | A1* | 11/2010 | Lu | G06F 3/017 345/159 |
| 2011/0317874 | A1* | 12/2011 | Ikenoue | G06F 3/017 382/103 |
| 2012/0276994 | A1* | 11/2012 | Lansdale | A63F 13/10 463/31 |
| 2014/0085316 | A1 | 3/2014 | Narayanan | |
| 2014/0267411 | A1* | 9/2014 | Fein | G06F 16/29 345/633 |
| 2014/0310764 | A1* | 10/2014 | Tippett | G06F 21/31 726/1 |
| 2015/0061994 | A1* | 3/2015 | Dai | G06F 3/017 345/156 |
| 2015/0293597 | A1* | 10/2015 | Mishra | G06F 1/163 715/810 |
| 2015/0316996 | A1* | 11/2015 | Dal Mutto | G06F 3/04815 345/156 |
| 2015/0350378 | A1* | 12/2015 | Hertel | H04L 67/42 709/203 |
| 2016/0088480 | A1* | 3/2016 | Chen | H04L 63/0823 713/171 |
| 2017/0034176 | A1* | 2/2017 | Qi | H04L 29/08 |
| 2017/0083694 | A1* | 3/2017 | Mardikar | G06F 21/32 |
| 2017/0220104 | A1* | 8/2017 | Goslin | G06F 3/011 |
| 2018/0159841 | A1* | 6/2018 | Toff | G06F 3/017 |
| 2018/0260581 | A1* | 9/2018 | Adams | G06F 21/6245 |
| 2018/0324413 | A1* | 11/2018 | Koerber | G02B 5/20 |
| 2019/0018186 | A1* | 1/2019 | Fattal | G02F 1/1336 |
| 2019/0036887 | A1* | 1/2019 | Miller | G06F 21/60 |
| 2019/0220863 | A1* | 7/2019 | Novick | G06Q 20/10 |
| 2019/0258320 | A1* | 8/2019 | Yang | G06F 3/0304 |
| 2019/0313059 | A1* | 10/2019 | Agarawala | H04L 67/38 |
| 2019/0346932 | A1* | 11/2019 | Dai | G06F 3/017 |
| 2020/0110301 | A1* | 4/2020 | Harrold | G09G 3/3611 |
| 2020/0112587 | A1* | 4/2020 | Jakubowski | H04W 12/1204 |
| 2020/0196141 | A1* | 6/2020 | Baker | H04W 12/02 |

OTHER PUBLICATIONS

Shiva et al., Augmented Reality: The Future Tense of 3D Advertisement, IEEE 2013, pp. 1-4. (Year: 2013).*
Just et al., A Comparative Study of Two Sate-of-the art Sequence Processing Techniques for Hand Gesture Recognition, Elsevier 2009, pp. 532-543. (Year: 2009).*
Latoschiket al., the Effect of Avatar Realism in Immersive Social Virtual Realities, ACM 2017, pp. 1-10. (Year: 2017).*
Sugiura et al., Public/Private Interactive Wearable Projection Display, ACM 2018, pp. 1-6. (Year: 2018).*
Yoh, Reality of Virtual Reality, IEEE 2001, pp. 1-9. (Year: 2001).*
International Search Report and Written Opinion Received for PCT Patent Application No. PCT/US2017/054309, dated Dec. 7, 2017, 14 pages.

* cited by examiner

INFORMATION PRIVACY IN VIRTUAL REALITY

CROSS-REFERENCE TO RELATED APPLICATION

This application claims priority to U.S. Provisional Patent Application No. 62/430,137, filed on Dec. 5, 2016, entitled "INFORMATION PRIVACY IN A VIRTUAL MEETING", the disclosure of which is incorporated by reference herein in its entirety.

TECHNICAL FIELD

This description generally relates to maintaining privacy for information used in virtual reality (VR) environments and/or augmented reality (AR) environments.

BACKGROUND

Virtual reality environments that allow multiple users to interact may provide for any number of interaction methods. While interacting in a multi-user VR space, user actions and inputs may be viewed by other users in the VR space. In addition, tracking mechanisms can capture and record user actions and input with cameras and sensors. Such an environment may not provide for exchange of information in a desirable fashion.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a computer-implemented method is described that includes generating, by at least one processor, a virtual reality experience in a virtual reality environment, detecting, a first gesture from a first user accessing the virtual reality environment, the first gesture being configured as a command to initiate a privacy mode with a second user accessing the virtual reality environment, and generating a prompt for display to the second user, the prompt corresponding to the command. In response to detecting a second gesture from the second user, the second gesture determined to substantially match the first gesture, initiating the privacy mode between the first user and the second user in the virtual reality environment, and sharing communications occurring in the virtual environment from the first user to the second user and from the second user to the first user while modifying, for users other than the first user and the second user, the communications occurring between the first user and the second user.

Implementations may include one or more of the following features. The method in which the communications include audial data that is electronically transmitted in the virtual reality environment according to the privacy mode. The method in which the communications include visual data that is electronically transmitted in the virtual reality environment according to the privacy mode. The method may further include terminating the privacy mode between the first user and the second user in response to detecting the first gesture by the first user a second time or in response to detecting the second gesture by the second user a second time. The method in which determining a match between the first gesture and the second gesture includes comparing gesture data associated with the first gesture to gesture data associated with the second gesture, the gesture data associated with the first gesture being based on the first gesture formed by the first user and the gesture data associated with the second gesture being based on the second gesture formed by the second user and determining whether movements defined by the first gesture data substantially overlap movements defined by the second gesture data.

Implementations may include one or more of the following features. The method in which the first gesture includes data corresponding to a movement of a portion of the body of the first user, the movement forming a predefined signal configured to initiate private communication in the virtual reality environment. The method in which the second gesture includes data corresponding to a substantially similar movement to the movement of a portion of the body of the first user, the second gesture being a movement performed by a portion of the body of the second user, the movement associated with the second gesture forming a predefined signal configured to initiate private communication in the virtual reality environment. The method in which the first gesture and the second gesture include tracked eye gaze movements performed in the virtual reality environment. The method in which the first gesture and the second gesture include tracked hand movements performed in the virtual reality environment. The method in which the tracked hand movements performed in the virtual reality environment include movements that generate a drawn shape, and the at least one processor detects the drawn shape and in response to detecting that the movements associated with the second user match at least a portion of the drawn shape, initiating a privacy mode between the first user and the second user. Implementations of the described techniques may include hardware, a method or process, or computer software on a computer-accessible medium.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
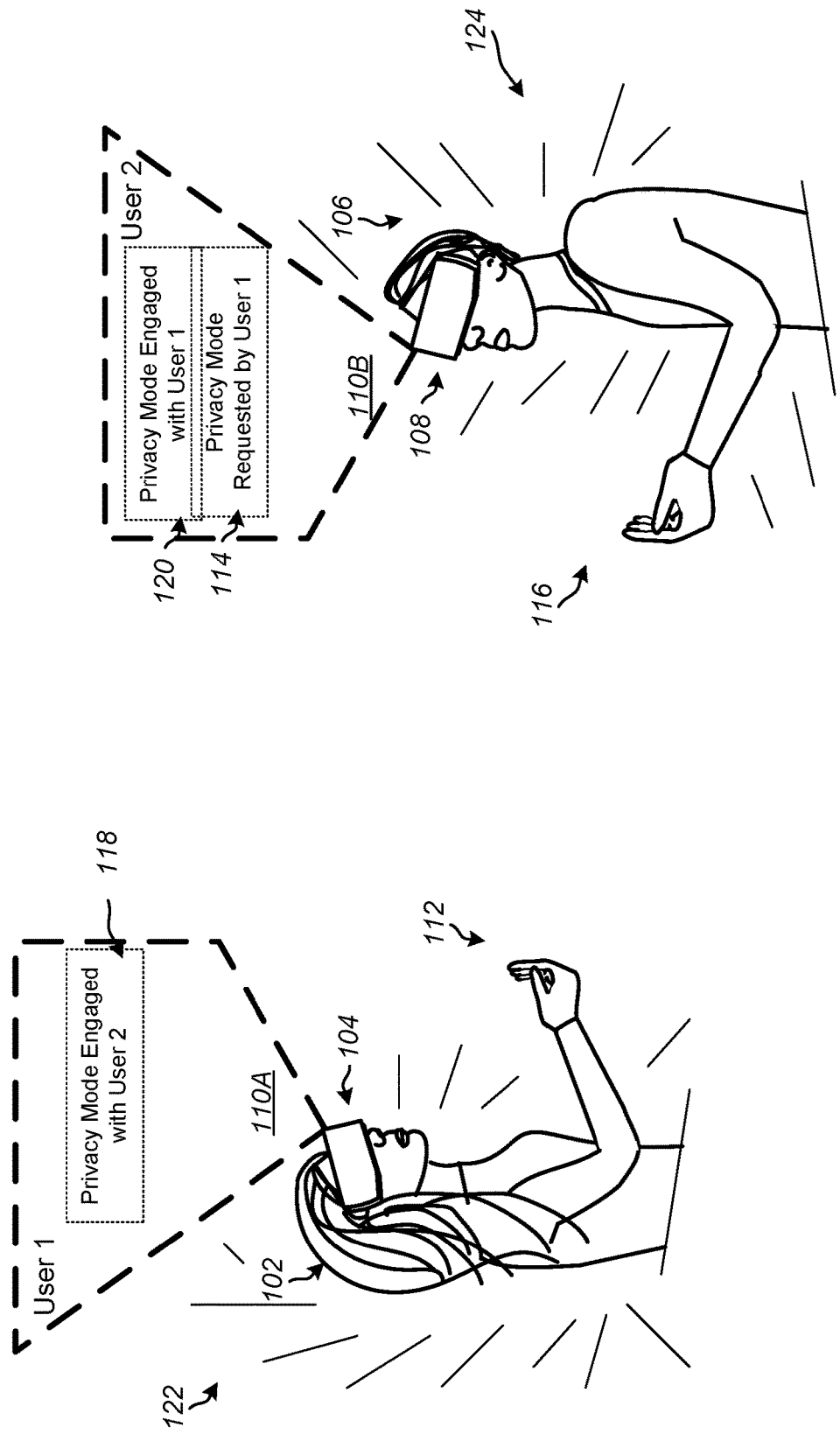
FIG. 1 is a diagram depicting an example of a user interacting while in a virtual reality (VR) space.

Meetings that take place in the physical world are generally scheduled in physical rooms or over the telephone. In these meetings, participants may privately chat outside of a main forum by whispering (e.g., when in a physical room) or by typing messages to one another (e.g., when on the telephone). Such interactions can be infeasible in virtual meetings that take place in a virtual space (e.g., VR space) because private typing may not be provided and voices are typically broadcasted to all other participants in a virtual meeting. However, many participants may wish to communicate privately. For example, participants may wish to discuss strategy, ask questions, or simply comment on a topic or discussion occurring in the virtual meeting. Accordingly, the systems and methods described herein can provide a way for users to share particular portions of information with certain users in a same VR space while maintaining data and user privacy from other users in the VR space.

The data privacy mechanisms described herein can ensure that user-entered data, user-interfaced data, and stored data remain private to particular users unless the user desires to share such information. For example, if the user wishes to share information with one or more other users in the VR space, the user can initiate a privacy mode with one or more other users. Initiating a privacy mode in a virtual reality environment (e.g., a VR space) can include performing a preconfigured gesture (e.g., movement, command, etc.) to initiate and terminate private virtual interactions (e.g., communications). For example, the private virtual interactions (e.g., communications) can be initiated by a gesture performed by a user. The gesture can be tracked by a VR system. The VR system can store the tracked gesture for carrying out future comparisons to gestures performed by other users in the VR space. In particular, the VR system can detect the gesture performed by a first user and generate a prompt to display to another user in the VR space. The second user may be indicated by the first user as a person in which private communication is desired. The VR system can await a gesture performed by the second user (e.g., in response to the prompt). If the second user performs substantially the same gesture, the VR system can initiate a privacy mode between the first and the second user. If the second user does not perform any gesture, the VR system can remove the prompt for the second user after a threshold time period. If the second user instead performs a second gesture that mimics (or substantially mimics) the first gesture, the VR system can initiate the privacy mode between the two users. Initiating the privacy mode between such users can include beginning to relay (e.g., share) communications occurring in the VR space from the first user to the second user (and from the second user to the first user) while modifying (e.g., suppressing, hiding, obscuring, etc.) such communications to other users in the VR space. That is, the initiation of the privacy mode can function to modify the communications occurring between the first user and the second user from users other than the first user and the second user.

Referring to FIG. 1, a user 102 is wearing a head-mounted display (HMD) device 104 and accessing a VR space. Similarly, a user 106 is wearing a head-mounted display device 108 and accessing the same VR space. The users 102 and 106 may be communicably coupled to one or more computers, mobile devices, portable electronic devices, controllers, and/or data repositories. For example, the user may be communicably coupled to one or more portable electronic devices to interact with the VR systems described herein. The portable electronic devices may include controllers, tracking devices, or computing devices. In one example, a portable electronic device may include, a computing device such as a virtual reality controller, or a mobile device (e.g., a smartphone, a tablet, a joystick, or other portable controller(s)) that may be paired with, or communicate with, the HMD devices 104 or 108 for interaction in the VR space.

In general, the VR space is a representation of an environment that may be generated for rendering in the HMD devices 104 and 108 (and/or other virtual reality hardware and software). In this example, the user 102 is viewing VR space 110A in HMD device 104. Similarly, the user 106 is viewing VR space 110B in HMD device 108. In some implementations, the VR spaces 110A and 110B may depict identical VR space content from a view configured for each user. In another example, VR space 110A may be different from VR space 110B. For example, if the user 104 is not engaged in a private mode of communication with the user 108, then the VR content shown in the VR spaces 110A and 110B may differ between users. A private mode of communication may be referred to below as a private session or privacy mode.

The exchange of data can be privatized or publicized based on one or more privacy configurations for each user. Similarly, the exchange of data can be privatized or publicized based one or more privacy configurations associated with the VR space. In one example, a user can preconfigure one or more gestures to be carried out to initiate a privacy mode. The gesture can be hand-based in that the user can perform a hand, finger, or arm movement (e.g., motion, command, etc.) to trigger the privacy mode. In some implementations, the gesture can be an eye-gaze or head motion to trigger the privacy mode. In yet other implementations, the gesture can be a body movement. In other implementations, the gesture can be configured as a movement carried out using a mobile device, a controller, or other computing device associated with a VR space.

As shown in FIG. 1, the user 102 has previously configured hand motion 112 as a privacy mode trigger. The user 102 and 106 may be engaged in a virtual meeting in a common VR space (e.g., VR space 110A and 110B). The user 102 can carry out the hand motion 112 to generate a prompt 114 for display for one or more users of whom user 102 wishes to privately communicate. If the user 102 chooses user 106 to privately communicate, the systems described herein can display the prompt 114 in VR space 110B. In one example, the prompt may include a banner display in the VR space 110B. The banner display may be private such that other users in a common VR space do not receive the prompt. In another example, the prompt may include a symbol or other communication indicating that user 102 wishes to communicate privately with user 106.

In response to receiving the prompt 114, the user 106 can mimic the gesture 112, as shown by the similar gesture 116. The systems described herein can detect the gesture 116. Upon detecting gesture 116, the systems can determine that gesture 116 is substantially similar to gesture 112 and can then initiate the privacy mode between user 102 and user 106. The initiation of the privacy mode may generate other messages or indicators in the VR space. For example, messages 118 and 120 indicate to each respective user that a privacy mode is in effect with another user. The privacy mode can enable both users to converse privately, pass text or images back and forth, and/or otherwise communicate in the privatized VR space. The privacy mode can take place in addition to the public virtual meeting. In one example, the virtual meeting may be carried out in another privacy session with other users while the user 102 carries out a private session with user 106.

In some implementations, the messages 118 and 120 may not appear. Instead, the systems described herein can provide other indications that a privacy mode is engaged between particular users. In one example, such indications may be public for all viewers. In other examples, such indications may be private and viewable only to the users engaged in the privacy mode. One example indication can include special effects applied to objects and/or users. For example, if two users (e.g., users 102 and 106) are engaged in a privacy mode, the avatars of user 102 and 106 may begin to glow, as shown by arrows 122 and 124. Similarly, the content being shared in a privacy mode can begin to glow. In another example, a lighting change in the VR space may indicate a privacy mode. Other visual effects are possible.

In some implementations, the prompt (e.g., messages) requesting a privacy mode may provide an option to the user receiving the prompt as to whether the receiving user wishes to keep the mode private. For example, a first user may wish to keep an initial communication private. Upon a second user determining that the group may benefit from the communication, aspects of the communication may be publicized, for example, if both users agree to publicize any portion of the previously private communication.

Figure 2:
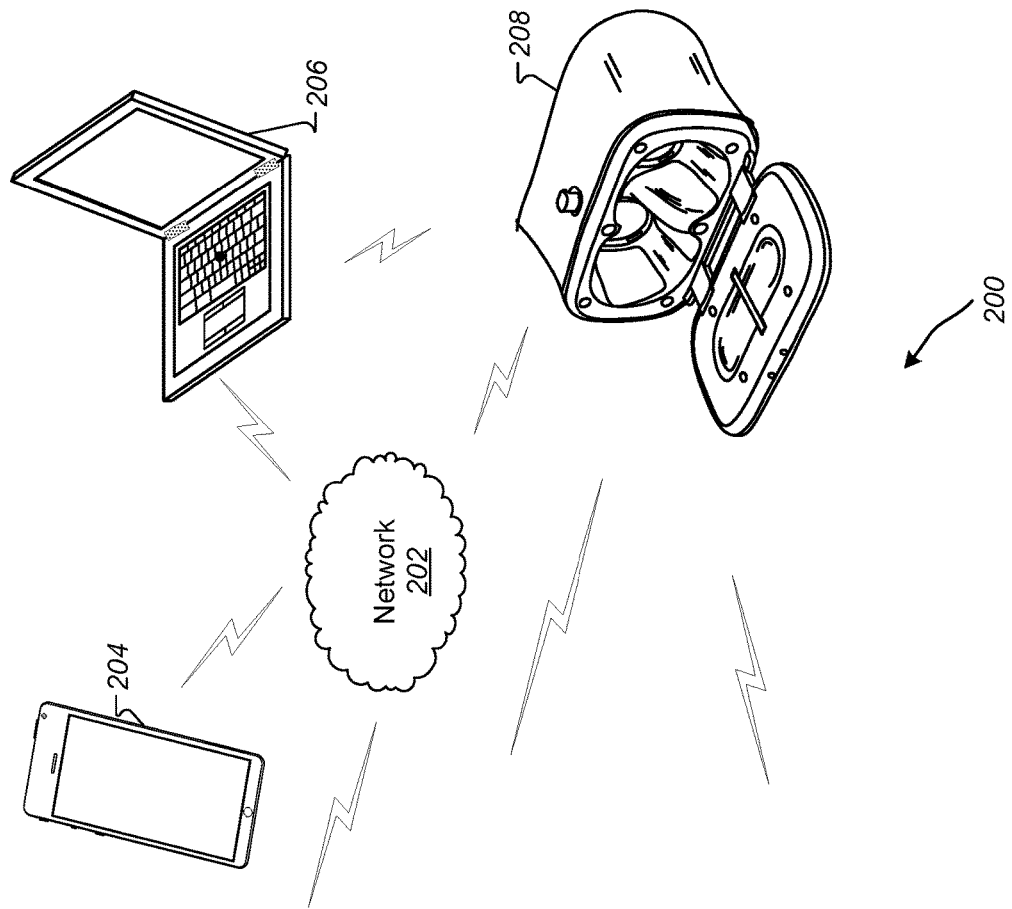
FIG. 2 is a block diagram of an example system for providing information privacy in the VR space.
Figure 2:
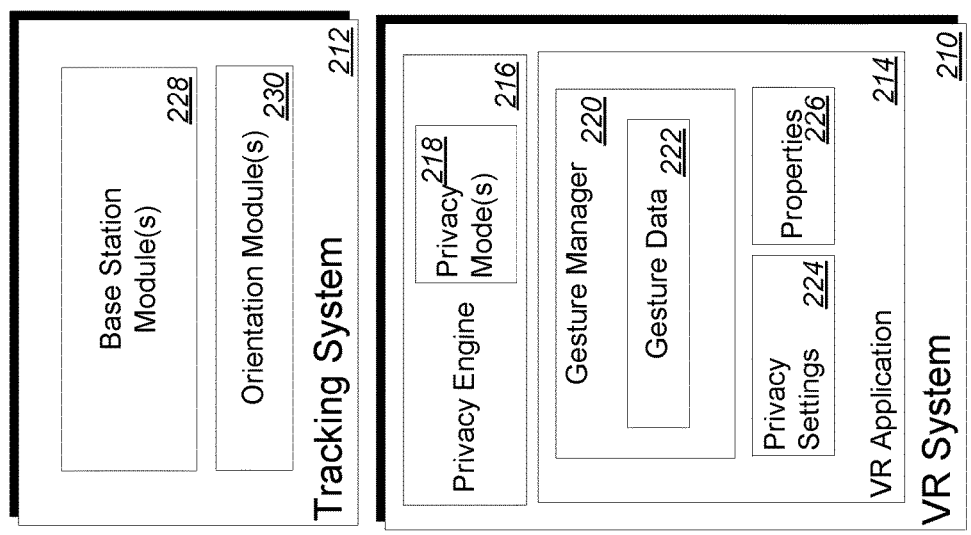

Referring now to FIG. 2, a block diagram is depicted of an example system 200 for providing information privacy in a VR space. The system 200 may provide a 3D VR space and 3D (volumetric) objects and VR content using the methods, components, and techniques described herein. In particular, system 200 can provide a user with a number of options in which to share private and public content amongst two or more users.

The system 200 includes a mobile device 204, a laptop computing device 206, a VR headset and/or a head mounted display (HMD) device 208, a VR system 210, and a tracking system 212. Devices 204, 206, and 208 may represent client devices. Mobile device 204, computing device 206, and HMD device 208 can include one or more processors and one or more memory devices. The devices 204-208 can execute a client operating system and one or more client applications that can access, control, and/or display VR content on a display device included in each respective device, or in a connected device.

The VR system 210 may represent a server device. In general, VR system 210 may include any number of repositories storing content and/or virtual reality software modules that can generate, modify, or execute virtual reality scenes. In the depicted example, VR system 210 includes a VR application 214 that can access and present content and/or controls for system 210. In some implementations, VR application 214 can run locally on one or more of devices 204-208. The VR application 214 can be configured to execute on any of devices 204, 206, and 208 and be controlled or operated upon using virtual controllers. In addition, the VR system 210 may be accessed and shared by any number of users as part of a shared VR space, for example.

The VR system 210 includes a privacy engine 216. The privacy engine 216 may be configured to apply and modify privacy settings (e.g., pertaining to privacy properties) applicable to users, virtual objects, menus, input, or output associated with a VR space. The privacy engine 216 can trigger prompts to be displayed for particular users in response to receiving a privacy request from a user. For example, the privacy engine 216 can modify input or output associated with content in the VR space or users (e.g., avatars of users) accessing the VR space. The modifications may include visually, audially, or tactilely changing any of the virtual objects, user representation, data, input or output provided in the VR space. The modifications may also include suppressing or hiding user movements. The modifications may also include suppressing, hiding, changing, and/or obscuring data. The modifications may also include suppressing, hiding, changing, and/or obscuring communications (e.g., messages). The modifications may also include muting VR audio content performed by one or more users in the VR space.

In one example, the privacy engine 216 can hide display data associated with input entered by one or more users from other users that are not engaged in a private mode. The display data may pertain to input, information, or gestures, or interactions associated with VR content that can be displayed in the VR space.

The privacy engine 216 includes one or more privacy modes 218. Privacy modes 218 can be configured by each user of the VR space. In one example, when a user sets up a virtual meeting to take place within a virtual environment, the user may define a series of gestures (e.g., swipes, circles, movements, etc.) that may serve as an effective secret handshake that can be stored. The stored gesture can be later mimicked by another user to gain access to a private communication (e.g., conversation) with another user. For example, to begin a private communication with a first user that has configured a gesture in the VR space, a second user can be provided information (e.g., a display of the gesture, a message detailing the gesture, etc.) to enable the second user to carry out the gesture. Upon the second user having accurately performed the gesture, the privacy mode between the first user and the second user can begin.

In general, a public mode can allow viewing and interaction with virtual objects and content within the same VR space. For example, a public mode may enable users of a particular VR space to view, modify, and interact with VR content generated by each user and/or view, modify, and interact with activities in which another user otherwise engages.

A private mode may block display from users other than the single user viewing, modifying, or interacting with content. For example, if a first user modifies, enters, or interacts with VR content in the VR space, the private mode may block, modify, or scramble display of the actual modification, entry or interaction for a second user (and/or other users) in the VR space.

A semi-private mode may provide access to a number of users in a particular VR space while blocking other users. The semi-private mode can be user-configured or system-configured. In some implementations, a first user can configure particular information to be public to a second user(s) when in a co-presence scenario in the VR space, but for such information to be otherwise private and/or unavailable outside of the co-presence scenario.

View only modes may provide view of particular content and virtual objects, but may restrict interaction to such content or objects by other users in the VR space. For example, when a first user views and interacts with VR content in the VR space, the view only mode may provide display, to a second user, the interaction and content on display for the first user, but may block interaction for the second user.

In some implementations, the privacy modes may include a whisper mode in which two users accessing the same VR space can have audio and/or visual access to private content and commentary. For example, if a first user is making eye contact (e.g., detected by eye gaze in tracking system 212) with a second user in the VR space, both users can confer (e.g., discuss) privately amongst each other and the systems described herein can block other users (separate from the first user and the second user) in the VR space from viewing or hearing content discussed or performed during such an interaction between the first user and the second user. The eye contact based whisper mode may be invoked by two users that perform an initial gaze for a length of time. The initial gaze may be triggered if both users gaze at each other for a predefined amount of time. For example, if the first user gazes at the second user and the second user engages to gaze with the first user, after about three to about five seconds, the whisper privacy mode can be invoked between the two users. To exit the whisper mode, one or both of the users can gaze away or turn a head or body away from the other user.

Referring again to FIG. 2, the VR application 214 includes a gesture manager 220. The gesture manager 220 is configured to match gestures (performed by users) to predefined and stored gesture data 222. The gesture manager 220 can sense (e.g., detect) particular gestures to obtain both position and orientation data associated with movements performed by a user accessing the VR space, for example. Using the position and orientation associated with user movements in the VR space, the gesture manager 220 can determine data indicators that can be matched to other detected gestures performed by users in the VR space.

In some implementations, the gesture manager 220 may access tracked and/or recorded movements provided by the tracking system 212, for example. The tracking system 212 can use tracked information to employ any number or type of method or algorithm to detect user-performed gestures. Example gestures may include a body movement, an eye movement, a head movement or other movement including, but not limited to, a grasp, a flip, a pull, a strike, a slide, a flick, a position adjustment, a push, a swipe, an eye gaze, a kick, a head tilt, a drawn shape, etc. The gestures may be carried out by the user using one or more of a body part, including, but not limited to a limb, a head, a body, a finger, a hand, a foot, eyes, etc. In some implementations, the gestures can be categorized by the gesture manager 220 comparing one or more parameters of the gesture. Example parameters may include a range of movement, a velocity of movement, an acceleration of movement, a distance of movement, a direction of movement, and/or a contact associated with the movement and one or more virtual objects in the VR space.

In some implementations, gestures are tracked as a series of vectors and rotations following predefined patterns. These patterns may be matched using fuzzy logic, allowing for some error at any stage but ensuring that the sum of all errors is beneath a predefined error threshold. Complex patterns can be matched using a state machine, which may expect a number of smaller sub-patterns to be performed in sequence, each one matched using fuzzy logic. An alternative approach to gesture recognition can include machine learning, in which a machine learning system is provided with a large number of example gestures being performed. The example gestures may be used to classify input as representing one or more gestures, or representing no gesture. Another alternative approach tracks gestures as a series of velocity changes and/or rotational changes of a tracked hand, controller, finger, and/or other device.

In operation of system 200, a first user can configure and store a first gesture for triggering a privacy mode to begin. The first gesture can be sent to a server (e.g., VR system 210). The first gesture can be accompanied by an indication of which one or more users of whom the first user wishes to begin communicating in a privacy mode. The indication may be detected by system 210. For example, the first user may nod at a second user. The nod can be used as the indication selecting the user with whom to privately communicate. In another example, the first user can instead point at a user, make eye contact for a predefined time period with a user, and/or perform a gesture at a particular user. The client (e.g., computing device at the indicated second user) may receive a system 210 generated (and transmitted) prompt to return the gesture (or another gesture configured to trigger privacy modes). The second user can perform the gesture to initiate the private communication (e.g., privacy mode) between the first user and the second user. In some implementations, the second user can return the gesture and trigger the system 210 to prompt the first user to confirm the privacy mode before initiating the privacy mode between the users.

While in the privacy mode, the VR system 210 can transmit or block from transmission particular head and hand movement for users (e.g., avatars representing users in the VR space). For example, the system 210 (using gesture manager 220) may display an avatar for a user in a state of rest when depicting the user to meeting participants that are not in a privacy mode while displaying, to users engaged in the privacy mode, expressive hand gestures and/or head and mouth movements performed by the user. Users engaged in a privacy mode can discuss shared virtual objects in the VR space in private. For example, a first user can begin drawing content that the first user wishes to show a second and third user engaged in the same privacy mode with the first user. The first user can begin to draw and for the other two users a virtual piece of paper may be displayed and drawing content can begin to be depicted in the shared (private) VR space. This shared (private) VR space may be shown in a portion of the view of the users and an ongoing virtual meeting or VR session can be depicted in another portion of view for the users.

At some point, one or more users may wish to terminate the privacy mode. To do so, one of the users may perform the first gesture again. In another example, another agreed upon gesture (or global gesture for termination) may be performed by a user. The system 210 can terminate the privacy mode between the users and return the users to a virtual meeting in progress in response to receiving a previously configured termination gesture.

The VR application 214 may also include or be associated with privacy settings 224 and privacy properties 226 that users, VR directors, and VR application developers can configure for VR spaces and may pertain to users, gestures, virtual objects, applications, events, or other VR related content. Privacy settings 224 may refer to definitions selectable to deem data such as content, audio, visual, textual, and/or tactile data or metadata as private or public with respect to user access and usage of such data. In some implementations, privacy settings may refer to system level privacy settings that apply to files, folders, applications, etc. In the VR space, these system details may be represented as virtual objects (e.g., a visual representation of the files, folders, applications, etc.). The privacy settings 224 can be assigned to virtual meetings. In some implementations, the privacy settings 224 can also be assigned to virtual objects and upon the user accessing such objects, the VR system 210 can indicate a level of privacy for each object. This can provide an advantage of allowing a user to understand which content is private and which content is public.

Privacy properties 226 may refer to user or virtual object related data. For example, a user (e.g., a user account) may be associated with a number of privacy properties pertaining to information exchange mechanisms and data and output mechanisms and data. In one example, if the information exchange mechanism is a gesture in the VR space and the output mechanism is display in the VR space, the privacy properties 226 may include tracked gestures, menu selections, audio associated with the gestures, and output of any or all related input gestures. Privacy properties 226 may be configured as rules and can be carried out in response to triggers occurring in the VR space.

Particular implementations described in this disclosure may enable a user to use one or more controllers, computing devices, objects, or gestures to interact with the VR space for purposes of entering text into applications or with respect to virtual objects in the VR space. Controllers and devices associated with VR system 210 can be tracked by tracking system 212, for example. In particular, devices in communication with VR system 210 can be viewed and/or tracked in system 200 in order to facilitate interaction in the VR space.

The tracking system 212 can be used to track one or more devices used to access the VR space. The devices may be tracked based on position, velocity, and acceleration data obtainable from particular computing devices, controllers, and/or base station devices represented in the VR space. For example, data may be obtained from an inertial measurement unit (IMU) associated with one or more devices while location data may be obtained from one or more tracked object (e.g., controllers, HMD devices) and/or base station modules 228 or orientation modules 230 associated with the VR space.

Additional data may also be obtained from a number of onboard sensors associated with devices accessing the VR space. Such data may pertain to accelerometer and gyroscope data, orientation data, correction data, and/or other sensor data indicating general or specific location information. The systems described herein can use such data to correlate six degrees of freedom of positional information for a tracked object within a predefined range to one or more other devices within the predefined range. The predefined range may be the entire VR space, a subset of the VR space, or other measurable range with respect to a user accessing the VR space.

In some implementations, the systems and methods described herein can access sensors associated with particular VR hardware to detect particular physical aspects about a user accessing the VR space. For example, an accelerometer on a user's mobile device communicably coupled to the VR space can be analyzed to detect whether the user is entering input in the VR space. The input may be textual, audio, gesture-based, and/or tactile in nature.

In some implementations, the VR system 210 may include or be communicably coupled to any number of processors and one or more computing devices capable of generating a VR experiences in a VR space (e.g., immersive virtual reality environment). In general, the one or more computing devices may be portable in a physical environment while a user access the VR space. In some implementations, the VR system 210 includes or is communicably coupled to a number of sensors capable of communicating with one or more electronic computing device. The sensors (not shown) may be configured to detect motion associated with a user accessing the at least one electronic computing device within the physical space.

The HMD device 208 may represent a virtual reality headset, glasses, eyepiece, or other wearable device capable of displaying virtual reality content. In operation, the HMD device 208 can execute a VR application 214, which can playback received and/or processed images to a user. In some implementations, the VR application 214 can be hosted by one or more of the devices 204, 206, or 208, shown in FIG. 2, or another device.

In some implementations, the example HMD device 208 may include a housing coupled to a frame, with an audio output device including, for example, speakers mounted in headphones. In the example HMD device 208, a display (not shown) may be mounted on an interior facing side of the front portion of the housing. Lenses may be mounted in the housing, between the user's eyes and the display. In some implementations, the HMD device 208 may include a sensing system including various sensors such as, for example, audio sensor(s), image/light sensor(s), positional sensors (e.g., inertial measurement unit including gyroscope and accelerometer), and the like. The HMD device 208 may also include a control system including processors and various control system devices to facilitate operation of the device 208.

In some implementations, the HMD device 208 may include one or more cameras (not shown) to capture still and moving images. The images captured by such cameras may be used to help track a physical position of the user or part of the user and/or controllers, computing devices, or other systems interoperable with VR system 210 in the real world, or physical environment relative to the VR space, and/or may be displayed to the user on the display in a pass through mode, allowing the user to temporarily leave the virtual environment and return to the physical environment without removing the HMD device 208 or otherwise changing the configuration of the HMD device 208.

In some implementations, the mobile device 204 can be placed and/or located within the HMD device 208. The mobile device 204 can include a display device that can be used as the display screen for the HMD device 208. The mobile device 204 can include hardware and/or software for executing the VR application 214. In some implementations, HMD device 208 can provide full tracking of location and user movements within six degrees of freedom. The tracking can be based on user hand movements, finger movements, head movements, eye movements, or tracking of controllers moving based on user input.

Additional devices are possible and such devices may be configured to be substituted for one another. In some implementations, the devices 204, 206, and 208 can be laptop or desktop computers, smartphones, personal digital assistants, portable media players, tablet computers, gaming devices, or other appropriate computing devices that can communicate, using the network 202, with other computing devices or computer systems.

In the example system 200, the HMD device 208 can be connected to device 204 or device 206 to access VR content on VR system 210, for example. Device 204 or 206 can be connected (wired or wirelessly) to HMD device 208, which can provide VR content for display in the VR space.

The example system 200 includes a number of computing devices that can exchange data over a network 202. The devices may represent clients or servers and can communicate via network 202, or another network. In some implementations, the client devices may include one or more gaming devices or controllers, a mobile device, an electronic tablet, a laptop, a camera, VR glasses, or other such electronic device that may be used to access VR content.

In some implementations, one or more content servers (e.g., VR system 210) and one or more computer-readable storage devices can communicate with the computing devices 204-208 using network 202 to provide VR content to the devices 204-208. In some implementations, the network 202 can be a public communications network (e.g., the Internet, cellular data network, dialup modems over a telephone network) or a private communications network. In some implementations, the computing devices 204-208 can communicate with the network 202 using one or more high-speed wired and/or wireless communications protocols (e.g., 802.11 variations, Wi-Fi, Bluetooth, Transmission Control Protocol/Internet Protocol (TCP/IP), Ethernet, IEEE 802.3, etc.).

Figure 3:
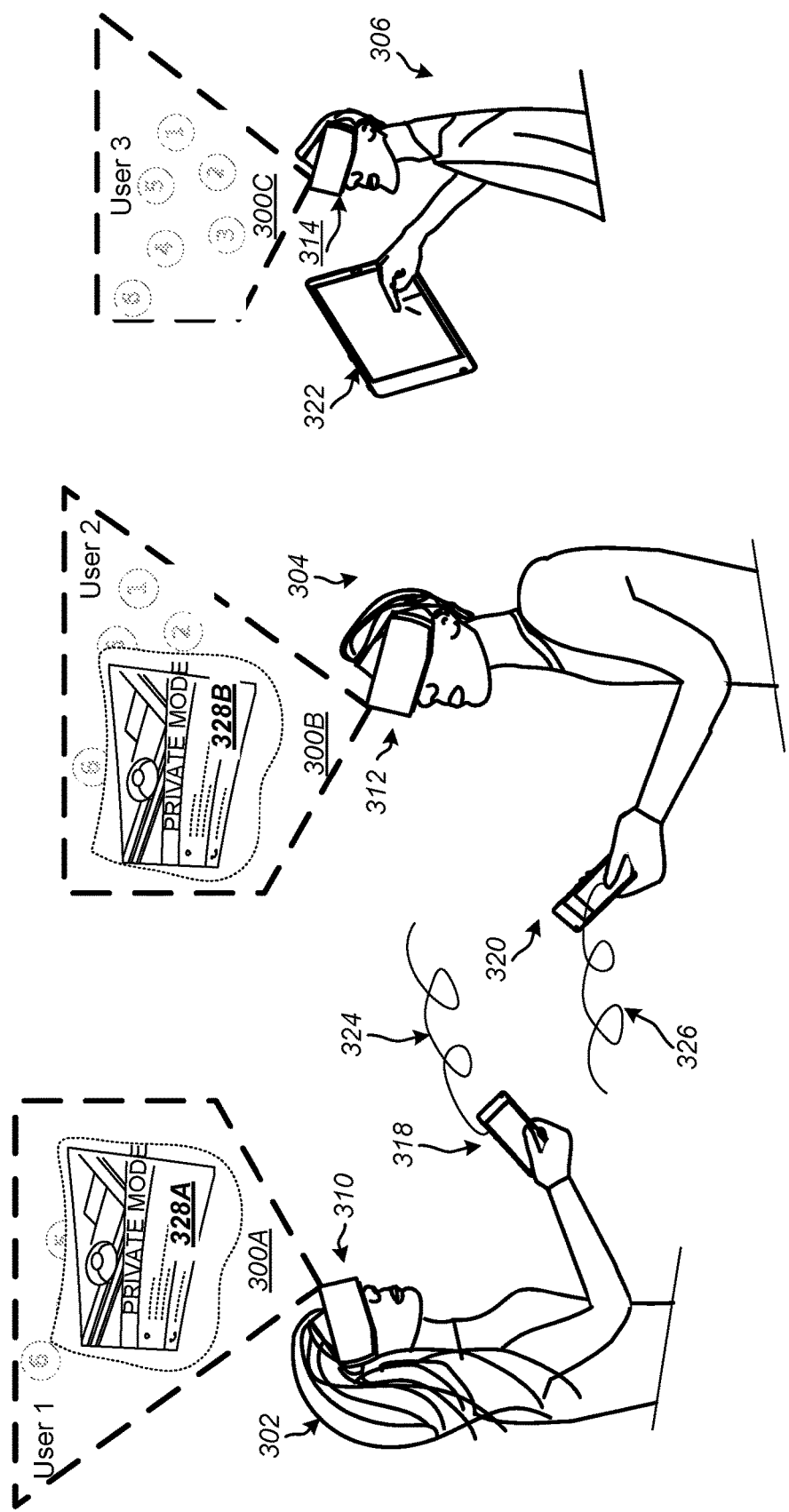
FIG. 3 is a diagram depicting an example of multiple users interacting in the same VR space.

FIG. 3 is a diagram depicting an example of multiple users interacting in the same VR space. The example implementation shown in FIG. 3 will be described with respect to one or more users wearing an HMD device that blocks out (e.g., substantially blocks out) the ambient environment, so that the HMD device generates a virtual environment/VR space, with the user's field of view confined to the VR space generated by the HMD device. However, the concepts and features described herein may also be applied to other types of HMD devices, and other types of virtual reality environments and augmented reality environments. For example, the systems and methods described herein can provide a way for users to generate and experience augmented reality (AR) content within VR meetings. In particular, viewable objects can include superimposed content on in or near the viewable objects. In addition, users can be represented with AR effects and enhancements. In some implementations, the entire VR space can be overlaid and/or modified to include AR effects including, but not limited to placing AR content in and around the VR space. One or more users in such a VR meeting can view and interact with the AR content. Privacy modes can be carried out on the AR content and effects in a similar fashion to the VR content and effects.

The examples shown in FIG. 3 include a user illustrated as a third-person view of the user wearing an HMD device and holding controllers, computing devices, etc. The views in areas 300A, 300B, and 300C, and represent a first person view of what may be viewed by each respective user in the VR space generated by each user's respective HMD device and the systems described herein.

Although three users (e.g., 302, 304, 306) are depicted in FIG. 3, any number of users can access and interact within the VR space. As shown, each user is accessing or associated with an HMD device (e.g., respective devices 310 for user 302, device 312 for user 304, and device 314 for user 306). In addition, each user may be associated with one or more controllers and/or computing devices. As shown in this example, user 302 is associated with computing device 318, user 304 is associated with computing device 320, and user 306 is associated with tablet computing device 322.

Each user 300A-300C is experiencing content in the VR space. For example, the users are all experiencing and viewing the number content 1, 2, 3, 3, 5, and 6 as virtual content in an ongoing virtual meeting taking place in the VR space. This virtual content is provided to all users in the VR space. In one example, the virtual content represents a presentation underway in the VR space. In another example, the virtual content represents a virtual environment with virtual objects that each user can interact with in the VR space. In other examples, the virtual content may be a movie, a teleconference, a gaming or online session, or other interactive content accessible by multiple users in virtual reality.

In the depicted example, user 302 is shown performing a gesture 324 with mobile device 318. Similarly, the user 304 is shown performing a substantially similar gesture 326 with controller 320. Such gestures 324 and 326 may be tracked via tracking devices within the VR space.

In particular, suppose that the first user 302 is in a virtual meeting with three users (e.g., users 302, 304, and 306. The first user 302 may have configured a gesture 324 of a spiral with three loops as the gesture that users perform in order to gain access to private conversation with the first user. The gesture manager 220 can store the gesture as gesture data 222 for comparison to other received gestures. When the second user 304 wishes to engage in private communication with the first user 302, the second user 304 may be prompted to perform the same gesture (e.g., the spiral with three loops) to invoke the private communication. The second user 304 can perform the gesture, as shown by gesture 326, and the privacy mode between the first user 304 and the second user 306 can be invoked. The gesture manager 220 may be configured to compare the gesture to the stored spiral with three loops gesture. If the gesture 326 performed is sufficiently close to the spiral gesture 324, then the gesture manager 220 indicates to both the first user and the second user that the privacy mode has been initiated, as shown at 328A and 328B. Both users can then converse (e.g., communicate) privately without disturbing the other participant(s) in the virtual meeting. If the gesture performed by the second user (e.g., performed and shown as an avatar of the second user) does not match the stored spiral gesture, then the gesture manager 220 may deny the privacy mode initiation until the second user performs a gesture sufficiently close to the spiral gesture.

The user 306, in this example, did not partake in the privacy mode. The user 306 is part of the virtual meeting, but was not invited to be in the private communication between user 302 and user 304. Thus, the user 306 is not privy to information and communications shared in the privacy mode enabled for user 302 and user 304.

Figure 4:
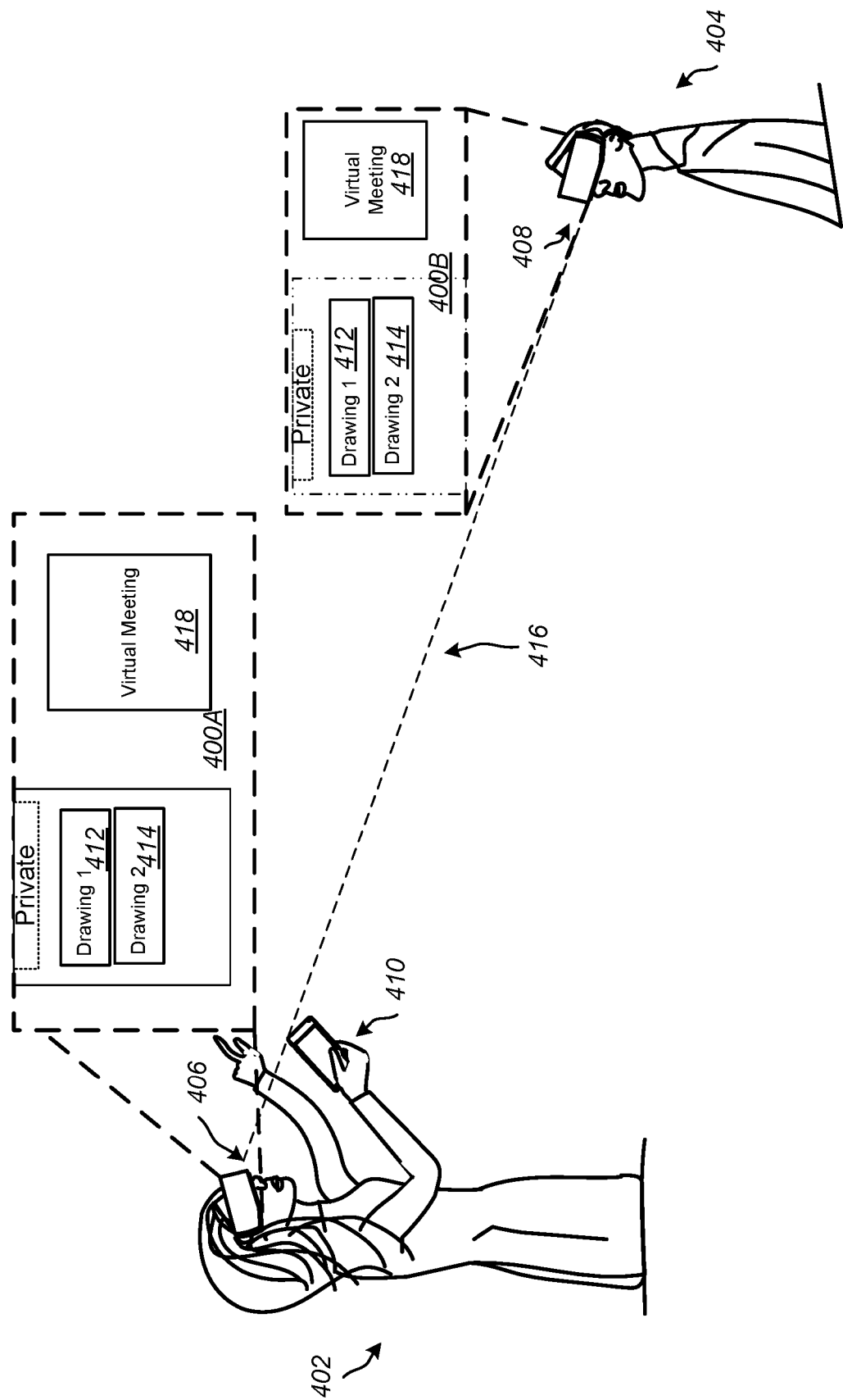
FIG. 4 is a block diagram depicting an example of multiple users interacting in a VR space.

FIG. 4 is a block diagram depicting an example of multiple users interacting in a VR space (400A-400B). The example implementations shown in FIG. 4 will be described with respect to one or more users wearing an HMD device that substantially blocks out the ambient environment, so that the HMD device generates a virtual environment/VR space, with the user's field of view confined to the VR space generated by the HMD device. However, the concepts and features described herein may also be applied to other types of HMD devices, and other types of virtual reality environments and augmented reality environments. In addition, the examples shown in FIG. 4 includes a user illustrated as a third-person view of the user wearing an HMD device and holding controllers, computing devices, etc. The views in 400A and 400B represent a first person view of what may be viewed by each respective user in the VR space generated by each user's respective HMD device and the systems described herein.

Although two users (e.g., users 402 and 404) are depicted, any number of users can access and interact within the VR space. As shown, each user is accessing or associated with an HMD device (e.g., respective devices 406 for user 402, device 408 for user 404). In addition, each user may be associated with one or more controllers and/or computing devices. As shown in this example, user 402 is associated with computing device 410. The VR system 210 may provide application data, privacy data, while tracking system 212 may track movements and input into the VR spaces 400A and 400B.

The user 402 is viewing (and/or creating) drawings and may wish to share the drawings with user 404, but may wish to keep the drawings private from any other users accessing the same shared VR space. Accordingly, the user 402 can make eye contact in the VR space with user 404. For example, the user 402 may invoke a representative avatar to look in the direction of an avatar representing user 404. The system 210 may detect that the eye contact is carried out for more than about five seconds, for example, and can engage a privacy mode between the two users 402 and 404 holding eye contact. The five seconds may be a threshold value configured in the VR system, for example, to trigger a privacy mode. Other time constraints are configurable for triggering particular privacy modes.

As shown in FIG. 4, the user 402 is accessing two drawings 412 and 414. The drawings 412 and 414 may be displayed to all users in the VR space if, for example, the user did not configure a privacy mode in the VR space. At some point, the user 402 may wish to share the drawing content (or other content) with another user accessing the same VR space. For example, user 402 may wish to share drawings 412 and 414 with user 404. In one example, the user 402 can perform a gesture (e.g., movement, command, etc.) to begin a privacy mode with user 404. The gesture may have been preconfigured or configured when the user determined to share the drawing content. In this example, the user configured an eye gaze gesture to initiate a privacy mode with another user. The eye gaze gesture can be configured by setting a time period threshold in which to hold a gaze of another user. For example, the user 402 can configure a threshold of about three seconds of elapsed time for an eye gaze occurring between particular users, as shown by line 416. Upon reaching the elapsed time of about three seconds during an eye gaze from user to user, the privacy mode can be initiated between users. In some implementations, the eye gaze can be configured for a threshold of about two seconds to about five seconds. In other implementations, the eye gaze can be configured for a threshold of about three seconds to about ten seconds.

In some implementations, after users enter a privacy mode, the system 200 can modify audio data in the VR space. For example, when the privacy mode is initiated between user 402 and user 404 during a virtual meeting occurring with a number of other users, the VR system can lower a volume of voices coming from users during the meeting for users engaged in both the meeting and a privacy mode. Lowering the volume of voices may include lowering a decibel level of the voices. Lowering the volume of the voices may include placing the voices as background to a private conversation occurring in a foreground. In one implementation, the virtual meeting may be broadcast on a first channel while a private meeting in a privacy mode may be broadcast on a second channel. Both channels may be configurable to be listened to at variable sound levels.

In some implementations, after users enter a privacy mode, the system 200 can modify visual data in the VR space. For example, when the privacy mode is initiated between user 402 and user 404 during a virtual meeting with a number of other users, the VR system can lock an avatar (representing a user) that is engaged in a privacy mode. The locked avatar may not depict the actual movements of the user in the privacy mode as to not detract from the virtual meeting underway. In one example, the user motions can be modified to small movements, as to not detract from the virtual meeting underway. Instead, the user may be motioning with hands and head movements during a private communication while the system 200 depicts the user slightly nodding or sitting still. Any other user in the private communication would view the avatar (representing the user) with real time user movements.

As shown, during an ongoing virtual meeting 418, the user 402 may have instigated a privacy mode by making three or more seconds of eye contact with user 404 (e.g., as shown by line 416). The user 404 may have received a prompt to return the gesture and may have done so. The privacy mode may then be instigated and the drawings 412 and 414 may then be depicted in VR space 400B for user 404. The privacy mode may remain active until one or both users indicate a desire to end the mode. In such an example, user 402 or user 404 may repeat the eye contact gesture. In another example, either user 402 or user 404 may perform a previously configured gesture for ending a private communication.

Figure 5:
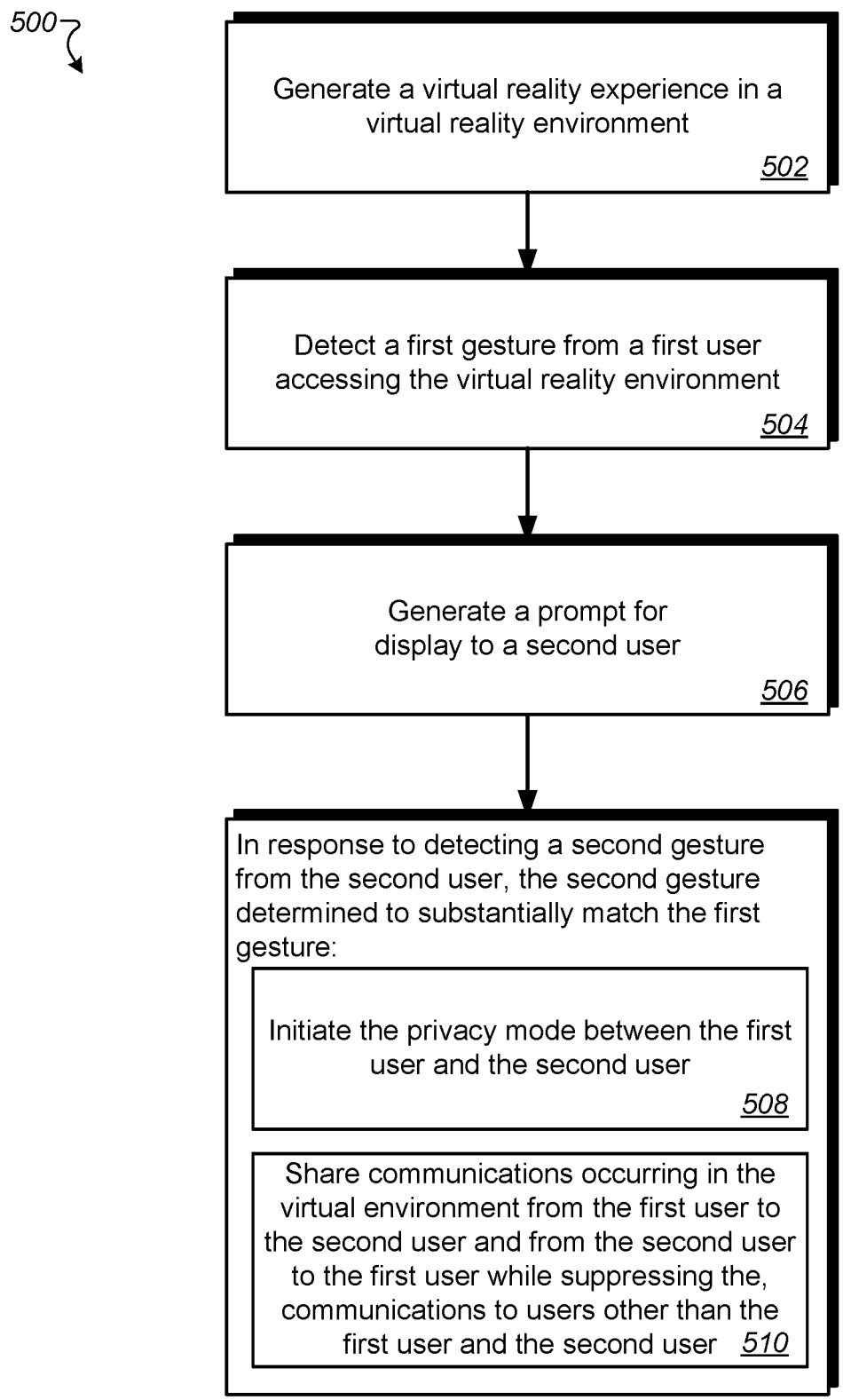
FIG. 5 is a flow chart diagramming one embodiment of a process to provide information privacy.

FIG. 5 is a flow chart diagramming one embodiment of a process 500 to provide information privacy. At block 502, the process 500 may include generating, by at least one processor, a virtual reality experience in a virtual reality environment (e.g., VR space). For example, the VR system 210 may generate the VR space for a number of users.

At block 504, the process 500 may include detecting, a first gesture from a first user accessing the virtual reality environment with a head mounted display device. The first user 102 may be accessing the VR space with HMD device 104. The first gesture may be configured as a command to initiate a privacy mode with a second user accessing the virtual reality environment with a head mounted display device. For example, a gesture may include a body movement, an eye movement, a head movement or other movement including, but not limited to, a grasp, a flip, a pull, a strike, a slide, a flick, a position adjustment, a push, a swipe, an eye gaze, a kick, a head tilt, a drawn shape, etc.

In general, the first gesture may include data (e.g., gesture data) corresponding to a movement of a portion of the body of the first user (e.g., user 102). The movement may form a predefined signal (e.g., command) configured to initiate private communication (e.g., modes) in the virtual reality environment.

At block 506, the process 500 may include generating a prompt for display to the second user. The prompt may correspond to the command (e.g., signal). In one example, the prompt may include a banner display 114 in the VR space (e.g., 110B). The banner display may be private such that other users in a common VR space 110B do not receive the prompt. In another example, the prompt may include a symbol or other communication indicating that user 102 wishes to communicate privately with user 106.

In response to detecting a second gesture from the second user, the VR system 210 can determine that the second gesture substantially matches the first gesture and can, at block 508, initiate the privacy mode between the first user 102 and the second user 106 in the virtual reality environment. In one example, determining a match between the first gesture and the second gesture may include comparing gesture data associated with the first gesture to gesture data associated with the second gesture to detect similarities in shape, movement, location, etc. The gesture data associated with the first gesture may be based on the first gesture formed by the first user. The gesture data associated with the second gesture may be based on the second gesture formed by the second user. In one example, the system 210 can determine whether movements defined by the first gesture data substantially overlap movements defined by the second gesture data. A substantial overlap can invoke a privacy mode between the first and second user.

In some implementations, the second gesture includes data corresponding to a substantially similar movement to the movement of a portion of the body of the first user. The second gesture may include a movement performed by a portion of the body of the second user. The movement associated with the second gesture may form a predefined signal configured to initiate private communication in the virtual reality environment. The predefined signal may correspond to vectors, locations, and/or other tracked movement in the VR space. In some implementations, the first gesture and the second gesture include tracked eye gaze movements performed in the virtual reality environment.

In some implementations, the first gesture and the second gesture include tracked hand movements performed in the virtual reality environment. The tracked hand movements may be performed in the virtual reality environment and can include movements that generate a drawn shape. For example, the drawn shape may be a circle, a square, a triangle, a polygon, a doodle, etc. The at least one processor can detect the drawn shape and can store the drawn shape in memory. In response to detecting that the movements associated with the second user (e.g., user 106) match at least a portion of the drawn shape, initiating a privacy mode between the first user (e.g., user 102) and the second user (e.g., user 106).

At block 510, the process 500 includes sharing communications occurring in the virtual environment from the first user to the second user and from the second user to the first user. Such communications can occur while modifying (e.g., suppressing, hiding, obscuring, etc.), for users other than the first user and the second user, the communications occurring between the first user and the second user. For example, user 102 may be in a private communication with user 106. Communications may flow freely between both users 102 and 106. However, the communications may not be provided to other users accessing the same VR space. In some implementations, the communications include audial data that is electronically transmitted in the virtual reality environment according to the privacy mode. In some implementations, the communications include visual data that is electronically transmitted in the virtual reality environment according to the privacy mode.

In some implementations, process 500 may include terminating the privacy mode between the first user and the second user, in response to detecting the first gesture by the first user a second time or in response to detecting the second gesture by the second user a second time. For example, if either user repeats the preconfigured gesture, the privacy mode may be terminated by system 210.

Figure 6:
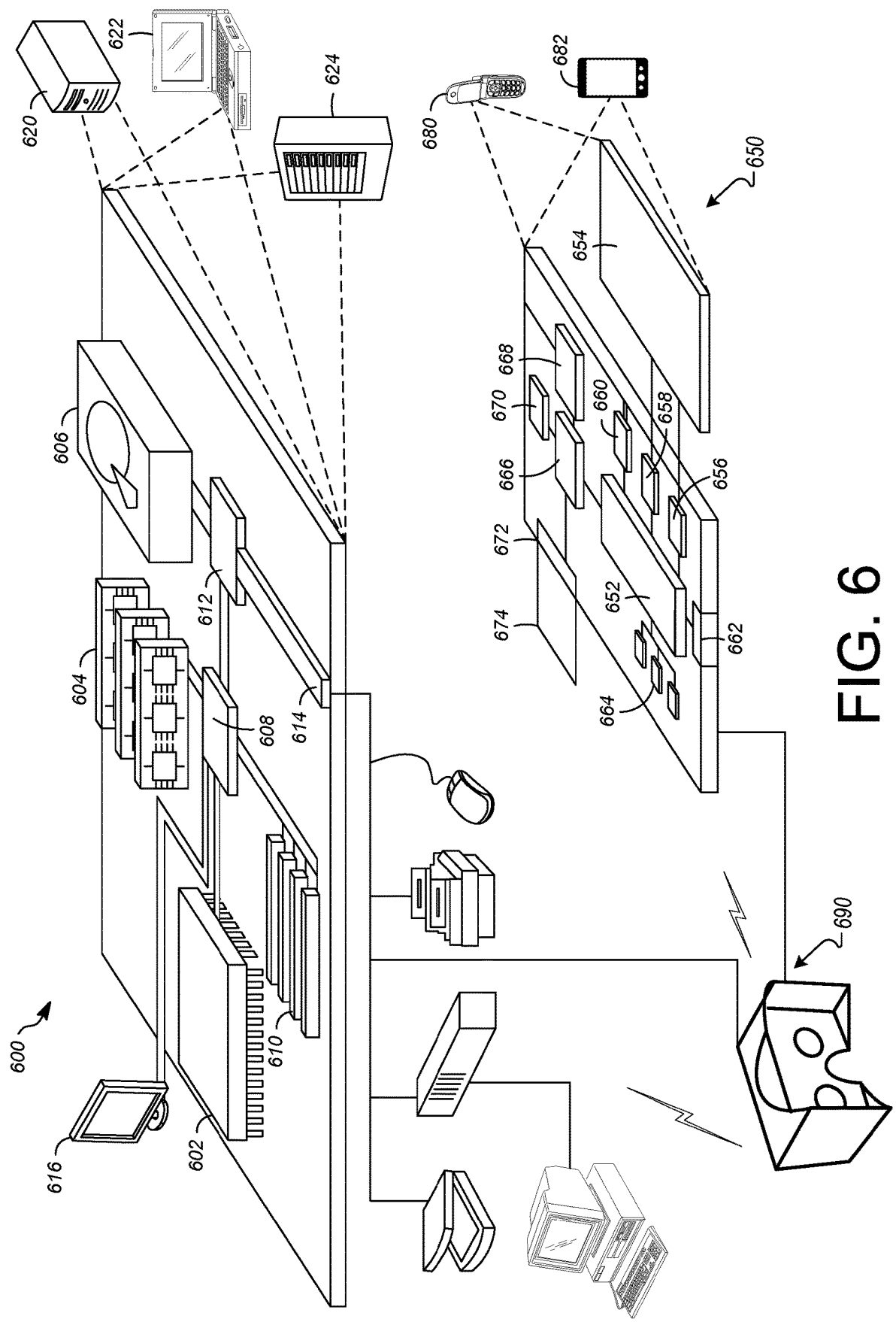
FIG. 6 illustrates an example of a computer device and a mobile computer device that can be used to implement the techniques described herein.

FIG. 6 shows an example of an example computer device 600 and an example mobile computer device 650, which may be used with the techniques described here. Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. In addition, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, Wi-Fi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. In addition, the term "module" may include software and/or hardware.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 6 can include sensors that interface with a virtual reality (VR headset 690). For example, one or more sensors included on a computing device 650 or other computing device depicted in FIG. 6, can provide input to VR headset 690 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 650 can use the sensors to determine an absolute position and/or a detected rotation of the computing device in the VR space that can then be used as input to the VR space. For example, the computing device 650 may be incorporated into the VR space as a virtual object, such as a controller, a laser pointer, a keyboard, a weapon, etc. Positioning of the computing device/virtual object by the user when incorporated into the VR space can allow the user to position the computing device to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 650 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 650 when the computing device is incorporated into the VR space can cause a particular action to occur in the VR space.

In some implementations, a touchscreen of the computing device 650 can be rendered as a touchpad in VR space. A user can interact with the touchscreen of the computing device 650. The interactions are rendered, in VR headset 690 for example, as movements on the rendered touchpad in the VR space. The rendered movements can control objects in the VR space.

In some implementations, one or more output devices included on the computing device 650 can provide output and/or feedback to a user of the VR headset 690 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 650 may appear as another object in a computer-generated, 3D environment. Interactions by the user with the computing device 650 (e.g., rotating, shaking, touching a touchscreen, swiping a finger across a touch screen) can be interpreted as interactions with the object in the VR space. In the example of the laser pointer in a VR space, the computing device 650 appears as a virtual laser pointer in the computer-generated, 3D environment. As the user manipulates the computing device 650, the user in the VR space sees movement of the laser pointer. The user receives feedback from interactions with the computing device 650 in the VR space on the computing device 650 or on the VR headset 690.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
    generating, by at least one processor, a virtual reality experience in a virtual reality environment;
    detecting, a first gesture from a first user accessing the virtual reality environment, the first gesture being configured as a command to initiate a privacy mode with a second user accessing the virtual reality environment;
    generating a prompt for display to the second user, the prompt corresponding to the command;
    in response to detecting a second gesture from the second user that is determined to match the first gesture, the gestures being tracked as a series of velocity changes:
        initiating the privacy mode between the first user and the second user in the virtual reality environment; and
        sharing communications occurring in the virtual reality environment from the first user to the second user and from the second user to the first user while modifying, for users other than the first user and the second user, the communications occurring between the first user and the second user; and
    in response to receiving agreement, from the first user and the second user, to share at least a portion of the communications from the privacy mode, triggering display of the portion of communications from the privacy mode.

2. The method of claim 1, wherein the communications include audial data that is electronically transmitted in the virtual reality environment according to the privacy mode.

3. The method of claim 1, wherein the communications include visual data that is electronically transmitted in the virtual reality environment according to the privacy mode.

4. The method of claim 1, further comprising terminating the privacy mode between the first user and the second user in response to detecting the first gesture by the first user a second time or in response to detecting the second gesture by the second user a second time.

5. The method of claim 1, wherein determining a match between the first gesture and the second gesture includes:
comparing gesture data associated with the first gesture to gesture data associated with the second gesture, the gesture data associated with the first gesture being based on the first gesture formed by the first user and the gesture data associated with the second gesture being based on the second gesture formed by the second user; and
determining whether movements defined by the first gesture data overlap movements defined by the second gesture data.

6. The method of claim 1, wherein the second gesture includes data corresponding to a similar movement to the movement of a portion of the body of the first user, the second gesture being a movement performed by a portion of the body of the second user, the movement associated with the second gesture forming a predefined signal configured to initiate private communication in the virtual reality environment.

7. The method of claim 1, wherein the first gesture and the second gesture include tracked eye gaze movements performed in the virtual reality environment, the eye gaze movements including a first user performing an initial gaze toward the second user that is detected to be met by a gaze performed by the second user for a predetermined time period.

8. The method of claim 1, wherein the first gesture and the second gesture include tracked hand movements performed in the virtual reality environment and the determination of a match between the first gesture and the second gesture is based at least in part on comparing the first gesture to the second gesture to determine a matched range of movement.

9. The method of claim 8, wherein the tracked hand movements performed in the virtual reality environment include movements that generate a drawn shape, and the at least one processor detects the drawn shape; and
in response to detecting that the movements associated with the second user match at least a portion of the drawn shape, initiating a privacy mode between the first user and the second user.

10. A system comprising:
at least one processor;
memory storing instructions that, when executed by the at least one processor, cause the system to perform operations including,
generating, by at least one processor, a virtual reality experience in a virtual reality environment;
detecting, a first gesture from a first user accessing the virtual reality environment, the first gesture being configured as a command to initiate a privacy mode with a second user accessing the virtual reality environment;
generating a prompt for display to the second user, the prompt corresponding to the command;
in response to detecting a second gesture from the second user that is determined to match the first gesture, the gestures being tracked as a series of velocity changes:
initiating the privacy mode between the first user and the second user in the virtual reality environment; and
sharing communications occurring in the virtual environment from the first user to the second user and from the second user to the first user while modifying, for users other than the first user and the second user, the communications occurring between the first user and the second user; and
triggering display of at least a portion of communications from the privacy mode, in response to receiving agreement, from the first user and the second user, to share the portion of the communications.

11. The system of claim 10, wherein the communications include visual data that is electronically transmitted in the virtual reality environment according to the privacy mode.

12. The system of claim 10, wherein determining a match between the first gesture and the second gesture includes:
comparing gesture data associated with the first gesture to gesture data associated with the second gesture, the gesture data associated with the first gesture being based on the first gesture formed by the first user and the gesture data associated with the second gesture being based on the second gesture formed by the second user; and
determining whether movements defined by the first gesture data overlap movements defined by the second gesture data.

13. The system of claim 1, wherein the first gesture includes data corresponding to a movement of a portion of the body of the first user, the movement forming a predefined signal configured to initiate private communication in the virtual reality environment.

14. The system of claim 10, wherein the first gesture and the second gesture include tracked eye gaze movements performed in the virtual reality environment, the eye gaze movements including a first user performing an initial gaze toward the second user that is detected to be met by a gaze performed by the second user for a predetermined time period.

15. A non-transitory computer readable medium containing instructions that, when executed by a processor of a computer system, cause the computer system to:
generate, by the at least one processor, a virtual reality experience in a virtual reality environment;
detect, a first gesture from a first user accessing the virtual reality environment, the first gesture being configured as a command to initiate a privacy mode with a second user accessing the virtual reality environment;
generate a prompt for display to the second user, the prompt corresponding to the command;
in response to detecting a second gesture from the second user that is determined to match the first gesture, the gestures being tracked as a series of velocity changes:
initiate the privacy mode between the first user and the second user in the virtual reality environment; and
provide communications occurring in the virtual environment from the first user to the second user and from the second user to the first user while suppressing, to users other than the first user and the second user, the communications occurring between the first user and the second user
in response to receiving agreement, from the first user and the second user, to share at least a portion of the communications from the privacy mode, triggering display of the portion of communications from the privacy mode.

16. The computer readable medium of claim 15, wherein the computer system is further caused to terminate the privacy mode between the first user and the second user in response to detecting the first gesture by the first user a second time or in response to detecting the second gesture by the second user a second time.

17. The computer readable medium of claim 15, wherein determining a match between the first gesture and the second gesture includes:
   comparing gesture data associated with the first gesture to gesture data associated with the second gesture, the gesture data associated with the first gesture being based on the first gesture formed by the first user and the gesture data associated with the second gesture being based on the second gesture formed by the second user; and
   determining whether movements defined by the first gesture data overlap movements defined by the second gesture data.

18. The computer readable medium of claim 15, wherein the first gesture includes data corresponding to a movement of a portion of the body of the first user, the movement forming a predefined signal configured to initiate private communication in the virtual reality environment.

19. The method of claim 1, wherein the first gesture further includes a contact associated with a virtual object in the virtual reality environment and the second gesture further includes a detected contact with the virtual object.

* * * * *

UNITED STATES PATENT AND TRADEMARK OFFICE
CERTIFICATE OF CORRECTION

PATENT NO. : 10,817,066 B2
APPLICATION NO. : 15/718689
DATED : October 27, 2020
INVENTOR(S) : Ross et al.

Page 1 of 1

It is certified that error appears in the above-identified patent and that said Letters Patent is hereby corrected as shown below:

On the Title Page

On Page 2, Column 2, Item (56), under "OTHER PUBLICATIONS", Line 3, delete "Sate-of-the" and insert -- State-of-the --, therefor.

Signed and Sealed this
Nineteenth Day of January, 2021

Andrei Iancu
*Director of the United States Patent and Trademark Office*